(12) United States Patent
Yang (10) Patent No.: US 10,422,407 B2
(45) Date of Patent: Sep. 24, 2019

(54) TORQUE CONVERTER DAMPER ASSEMBLY

(71) Applicant: Valeo Embrayages, Amiens (FR)

(72) Inventor: Zane Yang, Troy, MI (US)

(73) Assignee: Valeo Embrayages, Amiens (FR)

( * ) Notice: Subject to any disclaimer, the term of this patent is extended or adjusted under 35 U.S.C. 154(b) by 417 days.

(21) Appl. No.: 15/295,078

(22) Filed: Oct. 17, 2016

(65) Prior Publication Data

US 2017/0108075 A1 Apr. 20, 2017

Related U.S. Application Data

(60) Provisional application No. 62/242,353, filed on Oct. 16, 2015.

(51) Int. Cl.
*F16F 15/123* (2006.01)
*F16H 45/02* (2006.01)

(52) U.S. Cl.
CPC .... *F16F 15/12313* (2013.01); *F16F 15/1232* (2013.01); *F16H 45/02* (2013.01); *F16H 2045/0205* (2013.01); *F16H 2045/0221* (2013.01); *F16H 2045/0294* (2013.01)

(58) Field of Classification Search
CPC .......... F16D 3/12; F16D 3/14; F16D 2300/22; F16F 15/123; F16F 15/12313; F16F 15/1232; F16F 15/12326; F16F 15/1234; F16F 15/12353; F16F 15/13121; F16F 15/13164; F16F 15/134; F16F 15/1343; F16F 15/13438; F16F 15/13469; F16F 15/13484; F16F 15/137; F16F 15/1421; F16F 15/1428; F16F 15/145; F16F 15/1457; F16H 45/02; F16H 2045/0221; F16H 2045/0226; F16H 2045/0231
USPC ....... 464/67.1, 68.1, 68.4, 68.41, 68.7, 68.8, 464/68.9, 68.92
See application file for complete search history.

(56) References Cited

U.S. PATENT DOCUMENTS 4,027,757 A * 6/1977 Radke ............... F16F 15/12313
192/213.31
5,013,281 A * 5/1991 Graton ..................... B21J 9/025
192/212

(Continued)

FOREIGN PATENT DOCUMENTS

DE      102013214089 A1 *  1/2014   .............. F16D 13/58
FR           2885195 A1 * 11/2006   .......... F16F 15/1343
WO    WO-2014123174 A1 *  8/2014   .......... F16F 15/1428

*Primary Examiner* — Josh Skroupa
(74) *Attorney, Agent, or Firm* — Berenato & White, LLC (57) ABSTRACT

A damper assembly includes a driven plate, an intermediate plate, and elastic drive elements. The intermediate plate includes a radially outer base wall and opposite side walls. The elastic drive elements are interposed, between tabs of the driven plate and tabs of the intermediate plate to permit relative rotational movement therebetween. The elastic drive elements reside in cavities defined, in part, by a substantially annular radially inwardly facing surface of the intermediate plate. A first region of the radially inwardly facing surface in closest proximity to the elastic drive elements has a first radius. A second region of the radially inwardly facing surface axially interposed between the first region and the first side wall has a second radius that is greater than the first radius.

20 Claims, 5 Drawing Sheets

(56) References Cited

U.S. PATENT DOCUMENTS

| | | | | |
|---|---|---|---|---|
| 5,045,027 | A * | 9/1991 | Larsen | F16D 3/66 192/207 |
| 5,680,918 | A * | 10/1997 | Reik | F16F 1/324 192/55.1 |
| 5,984,065 | A | 11/1999 | Teramae et al. | |
| 8,267,799 | B2 * | 9/2012 | Schnaedelbach | F16F 15/1232 192/213.2 |
| 8,597,130 | B2 * | 12/2013 | Kombowski | F16F 15/12366 464/68.7 |
| 8,696,475 | B2 * | 4/2014 | Werner | F16D 3/12 464/67.1 |
| 8,720,658 | B2 * | 5/2014 | Ito | F16F 15/145 192/3.29 |
| 8,771,088 | B2 * | 7/2014 | Takikawa | F16H 45/02 464/68.8 |
| 9,011,257 | B2 * | 4/2015 | Kawahara | F16F 15/12366 464/68.8 |
| 9,470,290 | B2 * | 10/2016 | Hoffmann | F16F 15/145 |
| 9,605,729 | B2 * | 3/2017 | Kawahara | F16F 15/1428 |
| 9,618,054 | B2 * | 4/2017 | Hoffmann | F16F 15/13484 |
| 9,625,001 | B2 * | 4/2017 | Jimenez Perez Mitre | F16F 15/13453 |
| 2014/0339042 | A1 * | 11/2014 | Togawa | F16H 45/02 192/3.29 |
| 2015/0126290 | A1 * | 5/2015 | Hoffmann | F16F 15/13484 464/68.92 |
| 2015/0308539 | A1 | 10/2015 | Medellin et al. | |
| 2015/0323041 | A1 * | 11/2015 | Takikawa | F16F 15/145 192/3.29 |

* cited by examiner

TORQUE CONVERTER DAMPER ASSEMBLY

CROSS-REFERENCE TO RELATED APPLICATION AND CLAIM OF PRIORITY

This application claims the benefit of priority of U.S. Provisional Application No. 62/242,353 filed Oct. 16, 2015, the complete is incorporated herein by reference.

FIELD OF THE INVENTION

The invention generally relates to a damper assembly of a torque converter, and includes, more specifically, a damper assembly of a torque converter including an improved intermediate plate design. the invention also relates to a torque converter including the damper assembly.

BACKGROUND

In the evolution of automobiles from motorized carriages to highly regulated and computerized devices for mass transportation, there has been a continuous pursuit of refinement. One aspect of this refinement has involved the transmission of torque from an internal combustion engine to a drive system of the automobile. Torque transmission has been accomplished by various gear or chain driven transmission systems alternatively drivingly connected to, or disconnected from, a source of motive power for driving member), such as an internal combustion engine. The connection/disconnection feature of the drive system typically is accomplished using a clutch. Since the mid-1950's, especially in the United States, clutches typically have been a fluid clutch or a torque convener. Owing to the inclusion of fluid torque transmitting coupling, enhanced refinement of the driving experience has been obtained. However, this refinement has come at the expense of lost efficiency.

To address this lost efficiency, the torque converter has become, itself, an object of greater refinement and recaptured efficiency. Oftentimes, a contemporary torque converter includes a friction clutch assembly associated with a driven member of the torque converter which, at preset loads and speeds, replaces the fluid coupling of the torque converter with a direct mechanical friction coupling. This friction-clutch feature is commonly referred to as a lock-up clutch.

In current torque converters equipped with lock-up clutches, efficiency has been recaptured, but a loss of refinement is experienced when the clutch is in lock-up mode and when the clutch is transitioning into and out of lock-up mode. This is especially true when lock-up clutch elements become worn and tolerances between various rotating and fixed elements increase/decrease in accord with their respective wear patterns. The inclusion of an intermediate plate and elastic damping members reduces stiffness and improves vibration isolation, but add rotational mass and complexity to the torque converter sub-assemblies. The intermediate plate, which may be in contact with the elastic damping members at the outer surfaces of those damping members, carries the inertia and centrifugal force due to high rotational speeds of operation, thereby requiring an increase in the thickness or added reinforcement to the intermediate plate.

BRIEF SUMMARY OF THE INVENTION

According to a first aspect of the invention, a torque converter damper assembly is provided that includes a driven plate, an annular intermediate plate, and elastic drive elements. The driven plate includes a plurality of circumferentially spaced driven plate tabs. The annular intermediate plate includes a radially outer base wall, opposite first and second side walls, and a plurality of intermediate plate tabs circumferentially spaced from one another. The elastic drive elements are interposed between the driven plate tabs and the intermediate plate tabs to permit relative rotational movement between the driven plate and the intermediate plate. The elastic drive elements reside in a series of circumferential cavities defined, in part, by a substantially annular radially inwardly facing intermediate plate surface of the base wall of the intermediate plate. A first region of the substantially annular radially inwardly facing intermediate plate surface in closest proximity to the elastic drive elements has a first radius $R_1$. A second region of the substantially annular radially inwardly facing intermediate plate surface axially interposed between the first region and the first side wall has a second radius $R_2$ that is greater than the first radius $R_1$.

A second aspect of the invention provides a torque convener damper assembly including a driven plate, an annular intermediate plate, and elastic drive elements. The driven plate includes a plurality of circumferentially spaced driven plate tabs. The annular intermediate plate includes a radially outer base wall, opposite first and second side walls, and a plurality of intermediate plate tabs circumferentially spaced from one another. The elastic drive elements are interposed between the driven plate tabs and the intermediate plate tabs to permit relative rotational movement between the driven plate and the intermediate plate. The elastic drive elements reside in a series of circumferential cavities defined, in part, by a substantially annular radially inwardly facing intermediate plate surface of the base wall of the intermediate plate. A first region of the substantially annular radially inwardly facing intermediate plate surface in closest proximity to the elastic drive elements has a first radius $R_1$. A second region of the substantially annular radially inwardly facing intermediate plate surface axially interposed between the first substantially annular region and the first side wall has a second radius $R_2$ that is greater than the first radius $R_1$. A third region of the substantially annular radially inwardly facing intermediate plate surface axially interposed between the first region and the second side wall has a third radius $R_3$ that is greater than the first radius $R_1$.

Other aspects and embodiments of the invention, including apparatus, assemblies, devices including torque conveners, articles, methods of making and using, processes, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS AND EMBODIED METHODS OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper,' lower," "right," "left," "top," and "bottom" as well as derivatives thereof (e.g., "horizontally," "downwardly" "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the words "a" and "an" as used in the claims mean "at least one" and the word "two" as used in the claims means "at least two".

Figure 1:
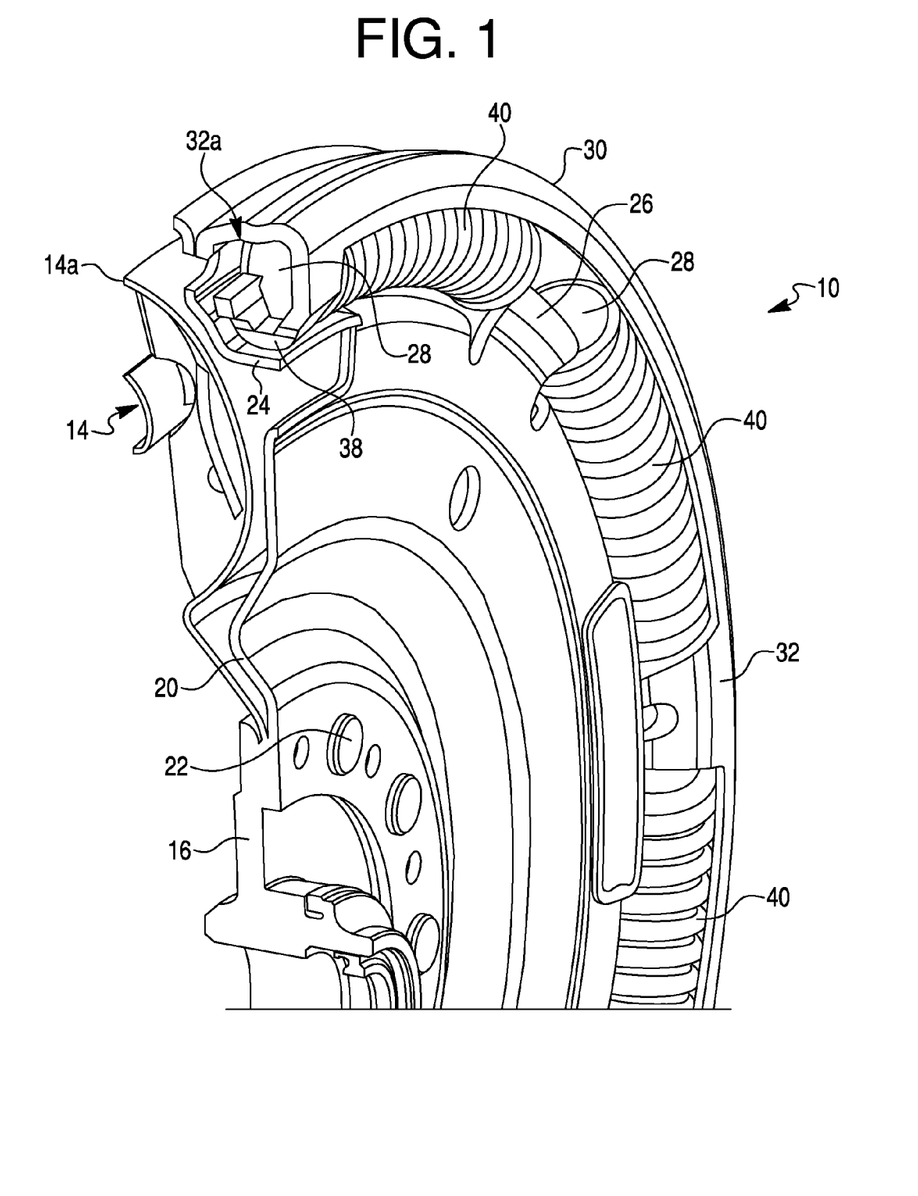
FIG. 1 is a fragmented perspective sectional view of a damper assembly according to an embodiment of the invention.
Figure 2:
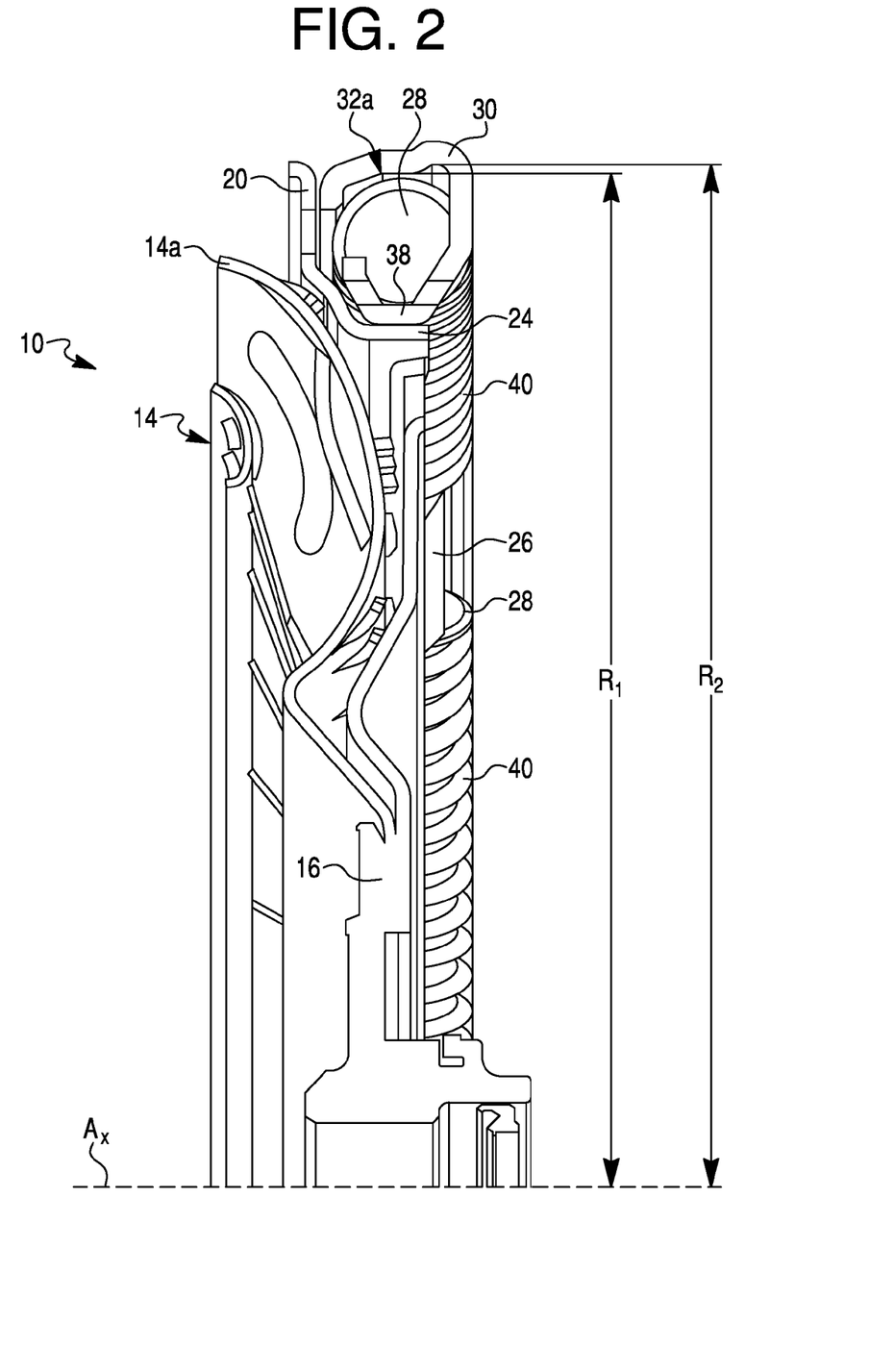
FIG. 2 is a fragmented radial sectional view of the damper assembly of FIG. 1.

FIGS. 1 and 2 illustrate a damper assembly 10 of a torque convener 11 according to an exemplary embodiment of the invention taken alone the same sectional line. The torque converter 11 includes an impeller (or pump) 12, a stator 13, and a turbine 14. Operation and construction of impellers, stators, and turbines of torque converters are known in the art. The torque convener 11 further includes a casing shell 15 fixedly connected to an engine output (such as a driveshaft or a flywheel of the driveshaft), an impeller shell 17, a weld 18 fixedly connecting the casing shell 15 to the impeller shell 17 to enclose a hydraulic cavity, and an axially movable piston 19.

The damper assembly 10 includes a substantially annular driven plate 20, a substantially annular driving plate 21 (FIGS. 5 and 6), a substantially annular intermediate plate 30, and elastic drive elements 40.

The driven plate 20 is fixedly associated with a turbine shell 14a of the turbine 14 at a turbine hub 16 to rotate as an integral unit. In other words, both the driven plate 20 and the turbine 14 are non-rotatably secured to the turbine hub 16. It should be understood that the driven plate 20, the turbine 14, and the turbine hub 16 may be non-rotatably secured to one another using any appropriate technique, such as, for example, welding, splining, and/or fasteners, such as rivets, such as rivet 22 shown in cross section in FIG. 5.

Figure 6:
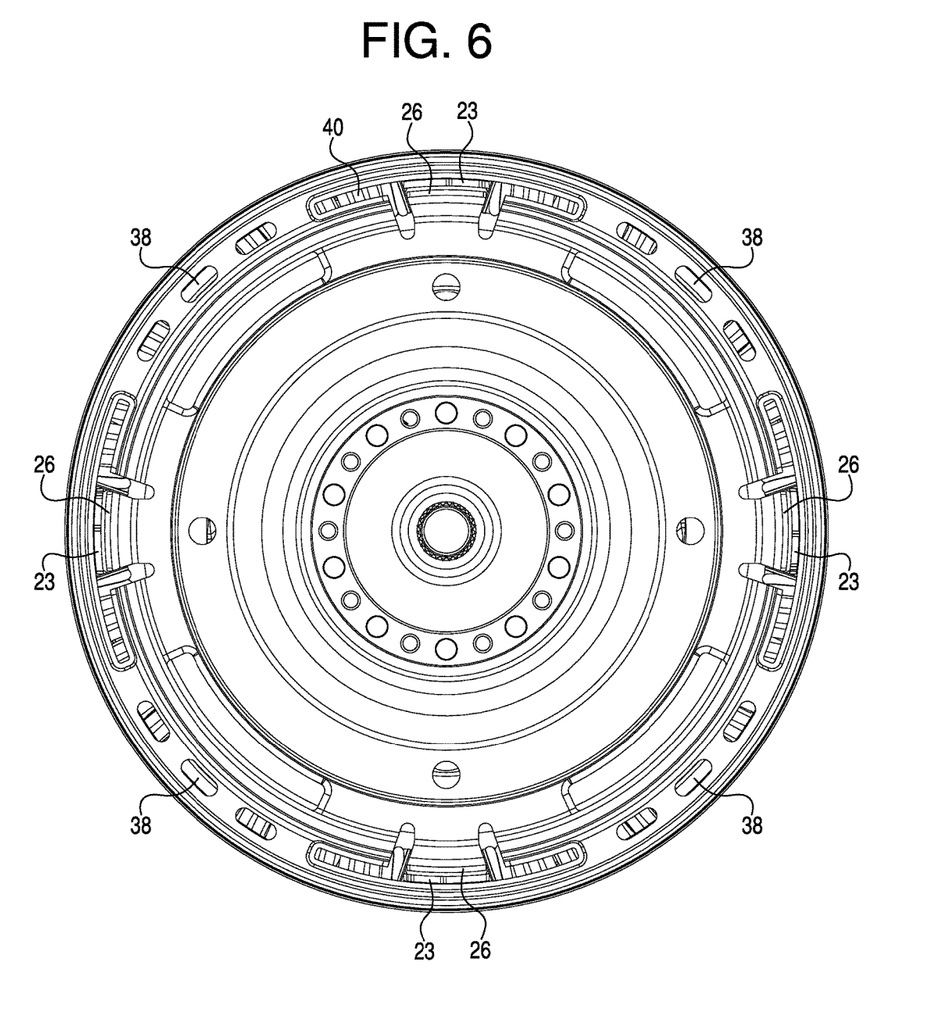
FIG. 6 is a front view of the torque converter of FIG. 5.

The driven plate 20 is provided with a circumferentially and axially extending driven plate flange 24 and a plurality of radially outwardly and circumferentially extending driven plate (or first) tabs 26. The driven plate tabs 26 are circumferentially spaced from one another, such as equidistantly about the periphery of the driven plate 20, as shown in FIG. 6. Opposite ends of the driven plate tabs 26 are associated with respective spring seats 28 circumferentially spaced from one another to engage respective elastic drive elements 40. It should be understood that the spring seats 28 are optional.

Figure 5:
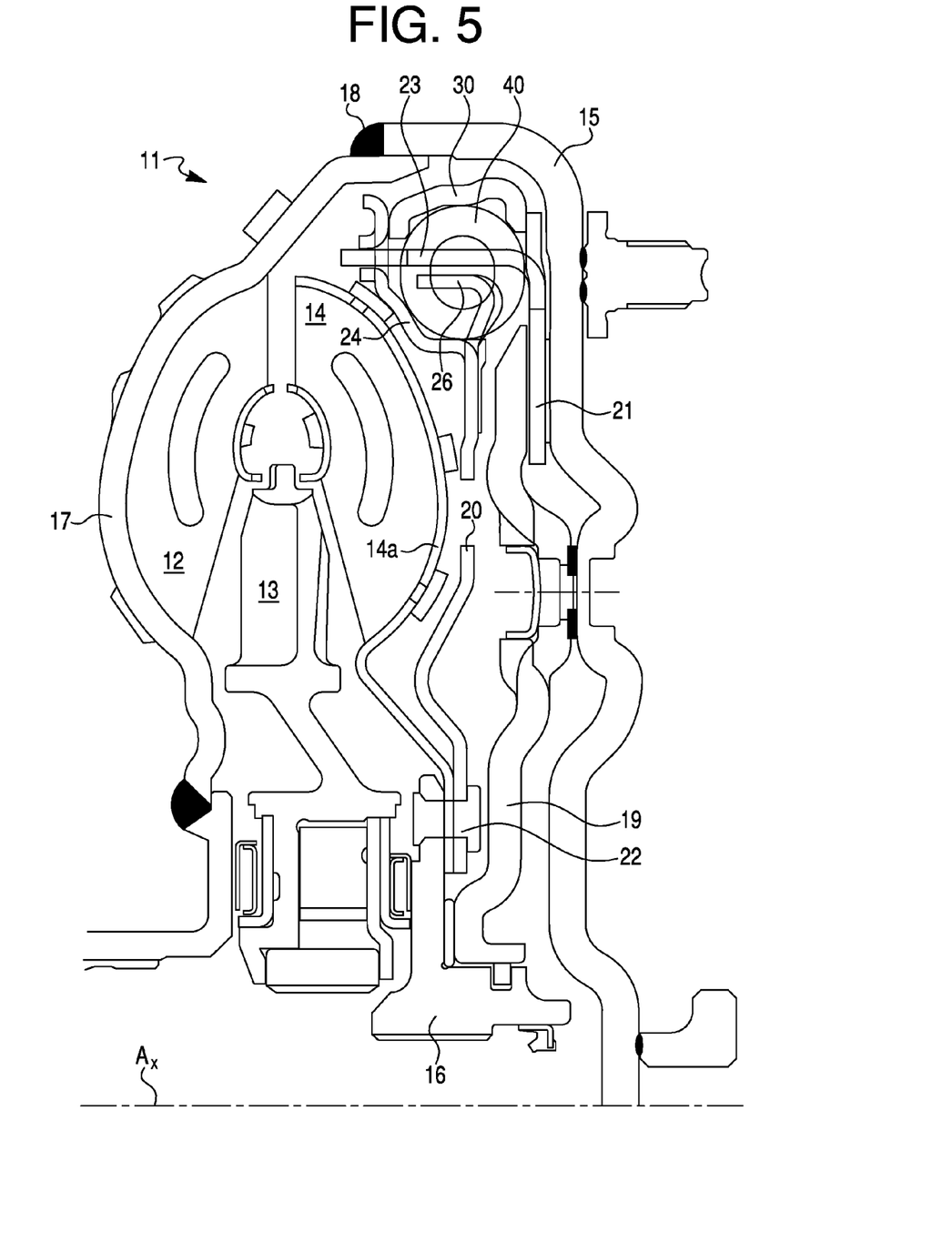
FIG. 5 is a cross-section view of a torque converter including the damper assembly of FIGS. 1-3 taken along a different radial section than FIGS. 1 and 2.

The driving plate 21 is not shown in FIGS. 1 and 2 for simplification purposes, but is shown in FIGS. 5 and 6. The driving plate 21 is provided with a plurality of axially and circumferentially extending driving plate tabs 23. As best shown in FIG. 6, the driving plate tabs 23 are circumferentially spaced from one another, such as equidistantly about the driving plate 21. Opposite ends of the driving plate tabs 23 are associated with the respective spring seats 28 of the driven plate tabs 26. The driving plate tabs 23 and the driven plate tabs 26 are circumferentially aligned with one another (that is, are centered on the same radial line) when the elastic drive elements 40 are in a non-compressed state, as shown in FIG. 6. The driving plate tabs 23 are radially outside of the driven plate tabs 26, as shown in FIGS. 5 and 6.

Figure 3:
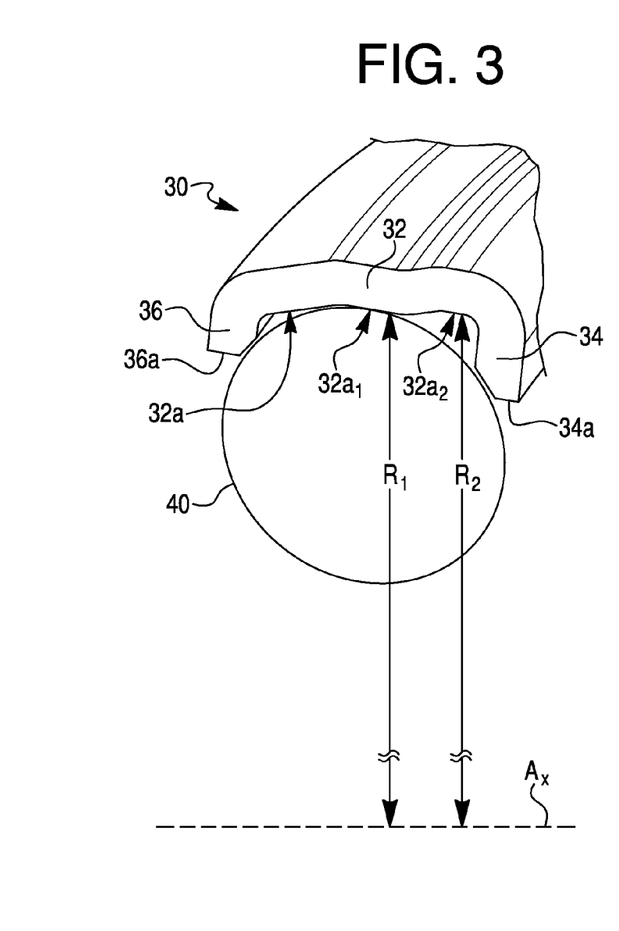
FIG. 3 is an enlarged perspective sectional view of an intermediate plate of the damper assembly of FIG. 1.

As best shown in FIG. 3, the intermediate plate 30 has a profile including an axially extending, radially outer base wall 32 and opposite first and second side walls 34, 36 extending substantially radially inwardly from opposite axial ends of the radially outer base wall 32. The opposite first and second side walls 34, 36 are illustrated integrally formed with base wall 32 as a unitary piece. A substantially annular radially inner surface 32a of the base wall 32 of the intermediate plate 30 establishes a wave-shaped groove.

As best shown in FIGS. 1 and 2, the intermediate plate 30 further includes a plurality of circumferentially spaced intermediate plate (or second) tabs 38 extending radially inwardly and circumferentially. The intermediate plate tabs 38 may be integrally formed with the first side wall 34, the second side wall 36, or both the first and second side walls 34 and 36. The embodiment shown in FIGS. 1 and 2 shows the intermediate plate tabs 38 integrally funned with and extending radially inward of the second side wall 36. Notably, FIGS. 1 and 2 each provide a sectional view taken along a radial line intersecting one of the intermediate plate tabs 38, whereas FIG. 5 provides a sectional view taken along a different radial line intersecting the driving plate tabs 23 and the driven plate tabs 26 but not the intermediate plate tabs 38.

The intermediate plate tabs 38 are circumferentially spaced from one another, such as equidistantly about the intermediate plate 30, as shown in FIG. 6. Opposite ends of the intermediate plate tabs 38 are associated with respective spring seats 28, which may be the same or different type of spring seats associated with the driven plate tabs 26. When the elastic drive elements 40 are at rest in the non-compressed state shown in FIG. 6, the intermediate plate tabs 38 are circumferentially offset from the driving plate tabs 23 and the driven plate tabs 26.

Regions of the intermediate plate 30 between the circumferentially spaced intermediate plate (or second) tabs 38 are referred to herein as interconnecting regions. A sectional view of one of the interconnecting regions of the intermediate plate 30 is illustrated in FIG. 3. The first side wall 34 and the second side wall 36 respectively terminate at ends 34a and 36a along the interconnecting regions of the intermediate plate 30.

The intermediate plate tabs 38 are directed radially inwardly and, as described below, deliver torque through elastic drive elements 40 to the driven plate 20. The intermediate plate tabs 38 overlie and may rest on the driven plate flange 24 when the intermediate plate 30 and the driven plate 20 are assembled as shown. The interface between the driven plate flange 24 and the intermediate plate tabs 38 also serves to center the intermediate plate 30 with respect to the driven plate 20.

The elastic drive elements 40 are contained within a series of circumferential curved cavities (also known as windows) (unnumbered), which may be stamped in the driven plate 20. The cavities have a radially outer boundary defined by the substantially annular radially inner surface (or surface regions) 32a of the base wall 32 of the interconnecting regions of the intermediate plate 30, a radially inner boundary defined by the driven plate 20, and circumferential end boundaries defined by the spring seats 28 of the tabs 23, 26, and 38. The containment of the elastic drive elements 40 between the driven plate flange 24 (contacting the radially inward portions of the elastic drive elements 40) and the radially inner surface regions 32a of the base wall 32 of the intermediate plate 30 (contacting the radially outward portions of the elastic drive elements 40) eases assembly and lessens the development of rattles as the assembled clearances of the damper assembly 10 alter with wear.

In hydrodynamic (non-lockup) mode, engine torque travels from the casing shell 15 and the impeller shell 17 (fixed together by weld 18) to the impeller 12, which hydrodynamically drives the turbine 14. Torque is transmitted from the turbine shell 14a of the turbine 14 to the turbine hub 16, which is fixed to the turbine shell 14a by rivets 22. The turbine hub 16 is in turn connected, such as by splines, to a transmission input shaft (not shown).

During operation in lockup mode, the piston 19 slides toward the casing shell 15 (to the right in FIG. 5) to frictionally lock the driving plate 21 to the casing shell 15. Movement of the piston 19 between lockup and non-lockup modes is performed by altering pressure on opposite sides of the piston 19, and is known in the art. In the lockup mode, torque input from the driveshaft travels from the casing shell 15 to the driving, plate 21 and its driving plate tabs 23, through the elastic drive elements 40 to the intermediate plate tabs 38 of the intermediate plate 30, through the elastic drive elements 40 to the driven plate tabs 26 of the driven plate 20, to the turbine hub 16, which in turn drives the transmission input shaft. The elastic driven elements 40 allow relative rotational movement between the intermediate plate 30 and the driving plate 21 and between the driven plate 20 and the intermediate plate 30 for damping torsional vibration.

The rotational movement of the elastic drive elements 40 during operation (spinning) of the torque converter damper assembly 10 generates a centrifugal load that bears on the intermediate plate 30. As larger mass (and hence size) elastic drive elements 40 are selected, for example for the purpose of enhancing damping, properties, the intermediate plate 30 experiences even greater centrifugal loads. To resist the centrifugal load imparted by the elastic drive elements 40, the radial wall height dimension of the intermediate plate 30 is preferably increased, and optionally maximized. Because of spatial constraints, however, the size of the elastic drive elements 40 and the radial wall height dimension of the intermediate plate 30 are inversely proportional, i.e. the maximum radial wall height decreases as the size of the elastic drive element 40 increases. Thus, it becomes difficult to increase the radial wall height dimension of the intermediate plate 30 when using large elastic drive elements 40.

As shown in FIG. 3, the radial wall height of the intermediate plate 30 may be increased for larger elastic drive elements 40 by beveling the inner edges of the ends 34a, 36a of the first and second side walls 34, 36 closest to the elastic drive elements 40.

Radial wall height of the intermediate plate 30 is also increased in the embodiment of FIGS. 1-3 as follows. A first region $32a_1$ of the substantially annular radially inwardly facing intermediate plate surface 32a of the base wall 32 in closest proximity to (e.g., contacting) the elastic drive elements 40 has a first radius $R_1$. The first region $32a_1$ is preferably substantially planar and substantially centered axially between the first and second side walls 34, 36. A second region $32a_2$ of the substantially annular radially inwardly facing intermediate plate surface 32a of the base wall 32 is axially interposed between the first region $32a_1$ and the first side wall 34. The second region $32a_2$ also preferably is planar. The second region $32a_2$ has a second radius $R_2$ that is greater than the first radius $R_1$. The difference between $R_2$ and $R_1$ is desirably greater than one-third (⅓) the thickness of the base wall 32. As shown in FIG. 3, the thickness of the base wall 32 and the first and second side walls 34 and 36 is substantially the same, i.e., the thickness is uniform over the entire width and length of interconnecting regions of the intermediate plate 30.

Figure 4:
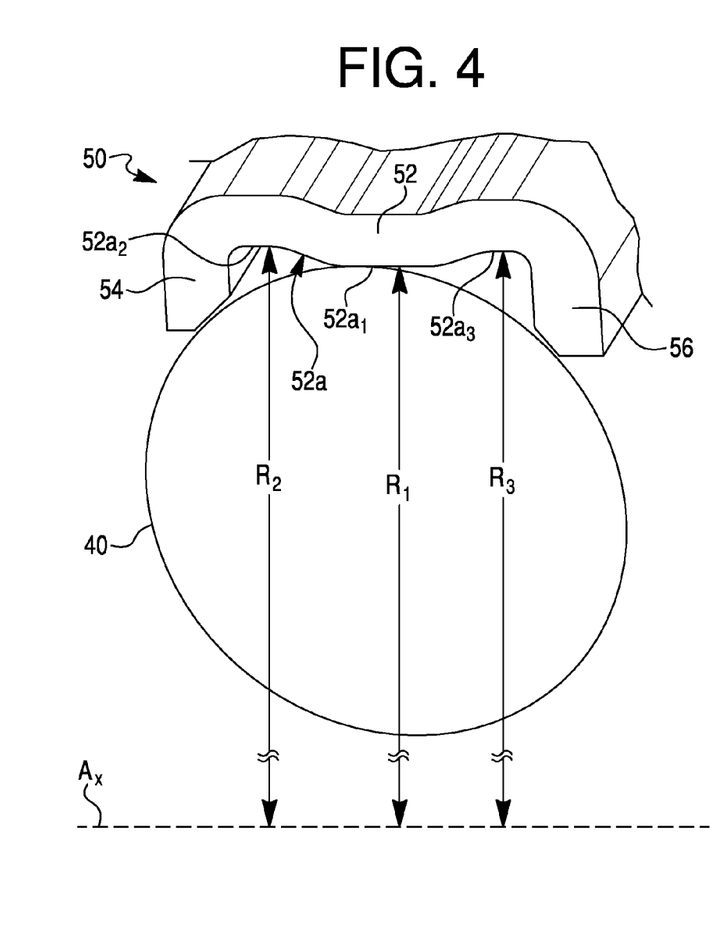
FIG. 4 is an enlarged sectional view of an intermediate plate of a damper assembly according to another embodiment of the invention.

An intermediate plate according to another embodiment of the invention is generally designated by reference numeral 50 in FIG. 4. The intermediate plate 50 may be substituted for the intermediate plate 30 of the torque convener damper assembly of FIGS. 1-3. In the interest of brevity, only parts that differ between the first and second embodiments are discussed below.

The profile of the intermediate plate 50 includes an axially extending, radially outer base wall 52 and opposite first and second side walls 54, 56 extending substantially radially inwardly from opposite axial ends of the radially outer base wall 52. A substantially annular radially inner surface 52a of the base wall 52 of the intermediate plate 50 along the interconnecting regions between the intermediate plate tabs establishes a wave-shaped groove. As shown in FIG. 4, the radial wall height of the intermediate plate 50 may be increased for larger elastic drive elements 40 by beveling the edges of the ends of the first and second side walls 54, 56 closest to the elastic drive elements 40.

A first region $52a_1$ of the substantially annular radially inwardly facing intermediate plate surface 52a of the base wall 52 in closest proximity to (or contacting) the elastic drive elements 40 has a first radius $R_1$. The first region $52a_1$ is preferably substantially planar and substantially centered axially between the first and second side walls 54, 56. A second region $52a_2$ of the substantially annular radially inwardly facing intermediate plate surface 52a of the base wall 52 is axially interposed between the first region $52a_1$ and the first side wall 54. The second region $52a_2$ has a second radius $R_2$ that is greater than the first radius $R_1$. The difference between $R_2$ and $R_1$ is desirably greater than one-third (⅓) the thickness of the base wall 52. As shown in FIG. 4, the thickness of the base wall 52 and the first and second side walls 54 and 56 is substantially the same, i.e., the thickness is uniform over the entire width and length of interconnecting regions of the intermediate plate 50, except at the beveled ends of the side walls 54, 56.

A third region $52a_3$ of the substantially annular radially inwardly facing intermediate plate surface $52a$ of the base wall 52 is axially interposed between the first region $52a_1$ and the second side wall 56. The third region $52a_2$ has a third radius $R_3$ that is greater than the first radius $R_1$. The difference between $R_3$ and $R_1$ is desirably greater than one-third (⅓) the thickness of the base wall 52. Desirably, the second and third regions $52a_2$ and $52a_3$ are flat surfaces that are coplanar with one another and parallel with the first region $52a_1$.

The driven plate 20, the driving plate 21, and the intermediate plates 30, 50, along with their associated tabs 26, 23, and 38, may be stamped from suitable steel or other resilient metal useful for forming torque converter and drive system elements. The elastic drive elements 40 are preferably wound steel springs (or coil springs) with sufficient capacity to transfer the torque for which the overall system is designed to transmit. Assembly of the component parts may take place in any suitable sequence, and is within the purview of a person of ordinary skill in the art having reference to this disclosure. Operation of torque converters in general is also known in the art, and such operational knowledge can be applied to the torque converters of the exemplary embodiments disclosed herein.

The above embodiments and features may be practiced in any combination with one another. Advantageously, the intermediate plate is stiffened to carry greater centrifugal loads due to heavier springs without requiring thickened blanked plates to metal-form the intermediate plate.

The foregoing description of the exemplary embodiment(s) of the present invention has been presented for the purpose of illustration in accordance with the provisions of the Patent Statutes. It is not intended to be exhaustive or to limit the invention to the precise forms disclosed, The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof it is also intended that the scope of the present invention be defined by the claims appended thereto.

What is claimed is:

1. A torque converter damper assembly, comprising:
a driven plate comprising a plurality of circumferentially spaced driven plate tabs;
an annular intermediate plate comprising a radially outer base wall, opposite first and second side walls, and a plurality of intermediate plate tabs circumferentially spaced from one another; and
elastic drive elements interposed between the driven plate tabs and the intermediate plate tabs to permit relative rotational movement between the driven plate and the intermediate plate, the elastic drive elements residing in a series of circumferential cavities defined, in part, by a substantially annular radially inwardly facing intermediate plate surface of the base wall of the intermediate plate,
wherein the opposite first and second side walls extend substantially radially inwardly from the radially outer base wall,
wherein a first region of the substantially annular radially inwardly facing intermediate plate surface in closest proximity to the elastic drive elements has a first radius $R_1$, and a second region of the substantially annular radially inwardly facing intermediate plate surface axially interposed between the first region and the first side wall has a second radius $R_2$ that is greater than the first radius $R_1$.

2. The torque converter damper assembly of claim 1, wherein the base wall has a uniform thickness.

3. The torque converter damper assembly of claim 2, wherein the difference between $R_2$ and $R_1$ is greater than one-third of the uniform thickness of the base wall.

4. The torque converter damper assembly of claim 1, wherein the first region is planar and in contact with the elastic drive elements.

5. The torque converter damper assembly of claim 4, wherein the second region of the substantially annular radially inwardly facing intermediate plate surface is planar and parallel to the first region.

6. The torque converter damper assembly of claim 1, wherein the driven plate tabs extend radially outwardly, and wherein the intermediate plate tabs extend radially inwardly.

7. The torque converter damper assembly of claim 1, wherein the opposite first and second side walls are integrally formed with the base wall as a unitary piece.

8. The torque converter damper assembly of claim 7, wherein the intermediate plate tabs are integrally formed with at least one of the side walls.

9. The torque converter damper assembly of claim 1, wherein the side walls have beveled inner edges.

10. The torque converter damper assembly of claim 1, wherein the driven plate tabs comprise spring seats contacting ends of the elastic drive elements.

11. A torque converter damper assembly, comprising:
a driven plate comprising a plurality of circumferentially spaced driven plate tabs;
an annular intermediate plate comprising a radially outer base wall, opposite first and second side walls, and a plurality of intermediate plate tabs circumferentially spaced from one another; and
elastic drive elements interposed between the driven plate tabs and the intermediate plate tabs to permit relative rotational movement between the driven plate and the intermediate plate, the elastic drive elements residing in a series of circumferential cavities defined, in part, by a substantially annular radially inwardly facing intermediate plate surface of the base wall of the intermediate plate,
wherein a first region of the substantially annular radially inwardly facing intermediate plate surface in closest proximity to the elastic drive elements has a first radius $R_1$, a second region of the substantially annular radially inwardly facing intermediate plate surface axially interposed between the first region and the first side wall has a second radius $R_2$ that is greater than the first radius $R_1$, and a third region of the substantially annular radially inwardly facing intermediate plate surface axially interposed between the first region and the second side wall has a third radius $R_3$ that is greater than the first radius $R_1$.

12. The torque converter damper assembly of claim 11, wherein the base wall has a uniform thickness.

13. The torque converter damper assembly of claim 12, wherein the difference between $R_2$ and $R_1$ is greater than one-third of the uniform thickness of the base wall, and wherein the difference between $R_3$ and $R_1$ is greater than one-third of the uniform thickness of the base wall.

14. The torque converter damper assembly of claim 11, wherein the first region is planar and in contact with the elastic drive elements.

15. The torque converter damper assembly of claim 14, wherein the second and third regions are planar and parallel to the first region.

16. The torque converter damper assembly of claim 11, wherein the driven plate tabs extend radially outwardly, and wherein the intermediate plate tabs extend radially inwardly.

17. The torque converter damper assembly of claim 11, wherein the opposite first and second side walls extend substantially radially inwardly from the radially outer base wall and are integrally formed with base wall as a unitary piece.

18. The torque converter damper assembly of claim 17, wherein the intermediate plate tabs are integrally formed with at least one of the side walls.

19. The torque converter damper assembly of claim 11, wherein the side walls have beveled inner edges.

20. The torque converter damper assembly of claim 11, wherein the driven plate tabs comprise spring seats contacting ends of the elastic drive elements.

\* \* \* \* \*